United States Patent [19]
Rosenberg

[11] 3,965,934
[45] June 29, 1976

[54] FLUID REGULATING DEVICES

[76] Inventor: Peretz Rosenberg, Moshav Bet Shearim, Israel

[22] Filed: Nov. 4, 1974

[21] Appl. No.: 521,004

Related U.S. Application Data

[62] Division of Ser. No. 269,256, July 5, 1972, Pat. No. 3,882,890.

[52] U.S. Cl. ........................... 137/624.14; 251/145; 239/542; 239/101
[51] Int. Cl.² ............................................. B05B 1/08
[58] Field of Search ................. 137/624.14, 505.44, 137/505.45, 525; 251/145; 239/99, 101, 102, 542

[56] References Cited
UNITED STATES PATENTS

| | | | |
|---|---|---|---|
| 1,780,876 | 11/1930 | Grosse | 239/102 UX |
| 2,646,039 | 7/1953 | Agosti | 239/102 UX |
| 2,890,838 | 6/1959 | Jannsen | 137/525 X |
| 3,039,699 | 6/1962 | Allen | 137/624.14 X |
| 3,275,030 | 9/1966 | Alvin | 251/145 X |
| 3,384,113 | 5/1968 | Pennin | 137/525 |

*Primary Examiner*—Alan Cohan
*Attorney, Agent, or Firm*—Benjamin J. Barish

[57] ABSTRACT

Fluid regulating devices comprise a tube having an axial passageway adapted to be connected to a fluid supply pipe, the tube being formed with a radial opening communicating with the axial passageway, and a ring surrounding the tube at the radial opening thereof, the ring having an inner diameter larger than the outer diameter of the tube such as to be set into vibratory movement towards and away from the radial opening thereof to regulate the flow of fluid therethrough. Described are a number of variations for different applications.

11 Claims, 13 Drawing Figures

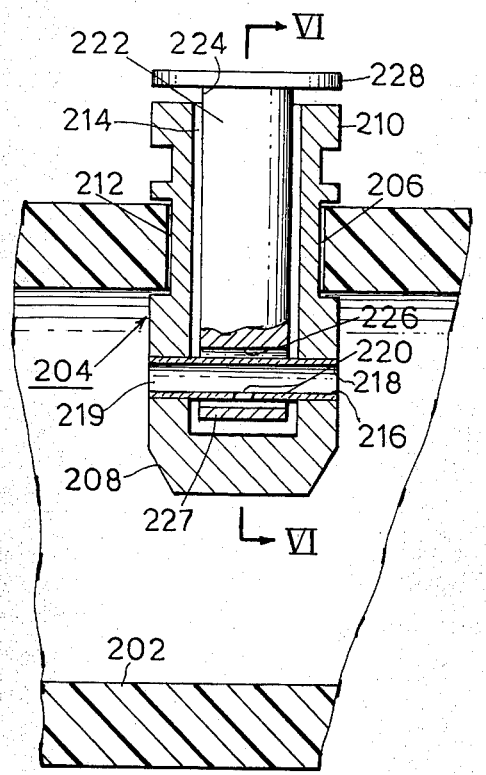
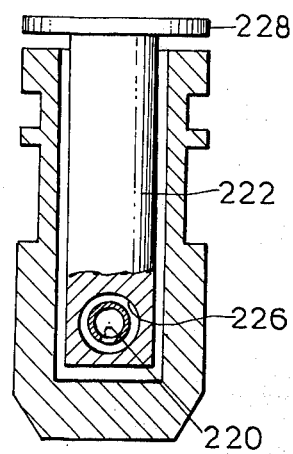
FIG.5
FIG.6
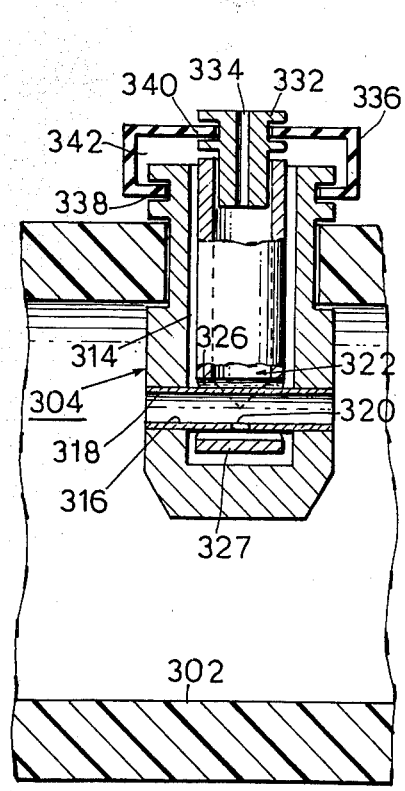
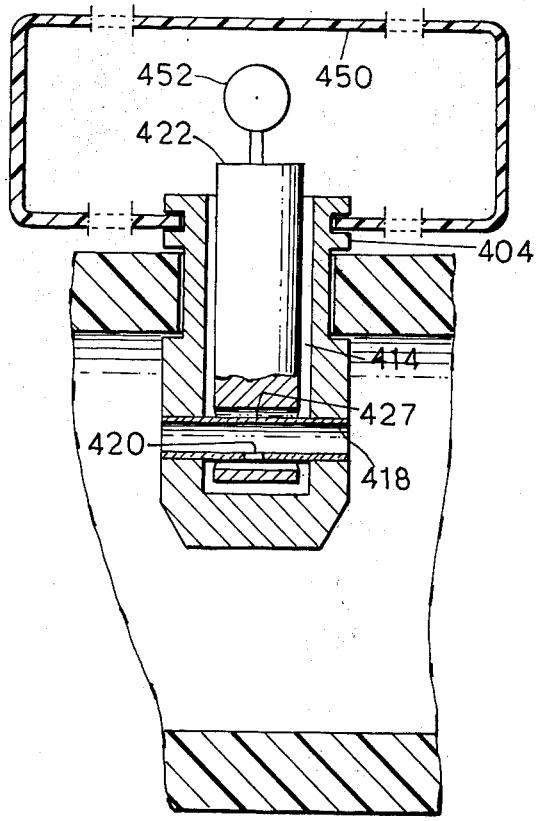
FIG.7
FIG.8

FLUID REGULATING DEVICES

CROSS-REFERENCE TO RELATED APPLICATIONS

Cross reference is made to Applicant's copending application Ser. No. 269,256 filed July 5, 1972, now Pat. No. 3,882,890 of which this is a Divisional Application, and also to Applicant's copending application Ser. No. 364,049 filed May 25, 1973.

BACKGROUND OF THE INVENTION

The present invention relates to fluid regulating devices, such as are used for regulating the flow of water from a supply pipe to various types of devices, e.g. rotary sprinklers, water trickler nozzles, and the like.

There are many applications for fluid regulating devices. One such application is for supplying water under a constant pressure to a rotary sprinkler. Another application particularly gaining wide-spread use at the present time is in trickle irrigation, wherein a trickler nozzle is tapped to a water pipe to provide a slow flow or trickle of irrigating water. A further application is in poultry drinkers, wherein the water supplied to the drinker is to be maintained at a predetermined level in the drinker receptacle.

The known fluid regulating devices usually involve a distinct design for each such application. In addition, the known designs usually require a large number of parts, which are costly to produce, install and maintain.

With respect to trickler nozzles, the known designs are generally characterized by the provision of a circuitous path and/or small openings or passageways for the water in order to reduce the rate of flow to a slow trickle. Such trickler nozzles easily become clogged and therefore necessitate frequent cleaning unless only highly filtered water is used. Further, cleaning the nozzles usually requires them to be disassembled which is inconvenient and time-consuming. The known trickler nozzles are also costly to produce.

BRIEF SUMMARY OF THE INVENTION

The present invention provides a fluid regulating device which has advantages in the above respects.

According to a broad aspect of the invention, there is provided a fluid regulating device, comprising a tube having an axial passageway adapted to be connected to a fluid supply pipe, the tube being formed with a radial opening communicating with the axial passageway, and a ring surrounding the tube at the radial opening thereof. The ring has an inner diameter larger than the outer diameter of the tube such as to be set into vibratory movement towards and away from the radial opening of the tube to regulate the flow of fluid therethrough.

As the water issues from the tube radial opening and impinges on the confronting inner face of the ring, it tends to set the ring into vibration, opening and closing the radial opening of the tube. It is believed that this is brought about by the interplay of the forces produced, on the one hand, by the water flow through the opening which, being at a relatively high velocity at the point of impingement on the ring, results in a low pressure area tending to move the ring against the opening; and on the other hand, by the tube water pressure acting on the ring when the opening is closed, tending to move the ring away from the opening.

More particularly, since the face of the tube in which the radial outlet opening is formed is curved with a smaller curvature than that of the face of the ring, the curved face of the ring diverges from the curved face of the tube outwardly from the periphery of the outlet opening formed in the latter face. This provides a spacing between the two curved faces which increases from the periphery of the outlet opening outwardly thereof. Accordingly, as the ring moves away from the outlet opening in the tube to permit the fluid to flow therethrough, a velocity gradient is produced in which the velocity is higher at the periphery of the opening than outwardly thereof, and therefore a pressure gradient is produced in which the pressure is lower at the periphery of the outlet opening than outwardly thereof. This low pressure at the outlet opening tends to move the ring towards that opening to close same. On the other hand, when the ring closes the opening, it is moved away from it by the force of the fluid at a radial opening. Thus, the pressure gradient acting with the fluid force sets the ring into vibratory movement towards and away from the tube outlet opening during the flow of fluid therethrough. This vibratory movement of the ring towards and away from the tube opening reduces the rate of flow through the opening, thereby permitting relatively large openings having less tendency to clog.

In the preferred embodiments of the invention described below, the device further includes a housing enclosing the ring and the outlet of the tube, the housing being formed with an outlet opening. The tube serves as a tubular conduit member and is formed with a radial passageway communicating at its inner end with its axial passageway and constituting, as its outer end, the mentioned outlet opening. The ring serves as a regulating member and includes a cylindrical bore of larger diameter than the diameter of the tube in which the tube is disposed.

In one described embodiment, the regulating member is mounted within the housing by a flexible diaphragm.

In other described embodiments, the conduit member is mounted within a first bore formed in the housing, and the regulating member is mounted within a second bore formed in the housing at right angles to the first bore. The second bore is closed at its inner end and is open at its outer end, the latter constituting the outlet opening of the housing and being disposed on the side of the tube opposite to the radial outlet opening therein.

A number of applications of such devices are described, for example for providing a high-pressure fluid line with one or more taps which are flow-responsive such as used in trickler nozzles, pressure-responsive such as used in supplying irrigating at a predetermined regulated pressure, and liquid-level-responsive such as used in supplying water to poultry drinkers.

A particularly important application of the present invention is in trickler nozzles. In this application, the ring is freely disposed within the housing and is unconnected thereto or to the tube. The rate of flow of the water is reduced to a trickle, not by circuitous paths or small openings, but rather by causing the ring to be set into rapid vibration, opening and closing the radial opening of the tube at a very rapid rate. Thus, even with very low rates of flow, the radial opening may be made quite large, thereby reducing the tendency to clog. Should clogging occur, this can be corrected in a very simple manner, without disassembling the device, as will be described below.

DESCRIPTION OF THE DRAWINGS

The invention is herein described, by way of example only, with reference to the accompanying drawings, wherein:

FIG. 5 is a longitudinal sectional view of a flow-responsive regulated tap constructed in accordance with a variation of the invention;

FIG. 6 is a sectional view along lines IV—IV of FIG. 5;

FIG. 7 is a longitudinal sectional view, similar to that of FIG. 5, of a pressure-responsive regulated tap constructed in accordance with the FIG. 5 variation of the invention;

FIG. 8 is a longitudinal sectional view of a liquid-level responsive regulated tap constructed in accordance with the FIG. 5 variation of the invention;

DESCRIPTION OF THE FIGS. 1–4 EMBODIMENT

FIGS. 1–4 illustrate a pressure-regulated tap for fluid lines which may be used for regulating the pressure of the water supplied to a plurality of rotary water sprinklers.

Figure 1:
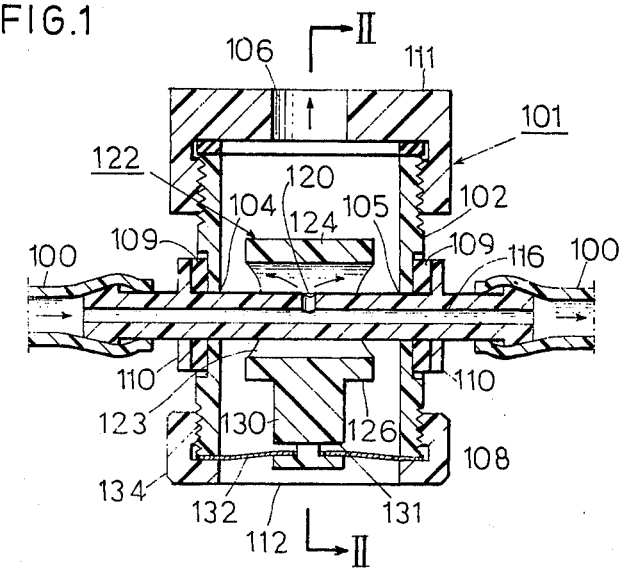
FIG. 1 is a sectional view of one form of fluid pressure regulator constructed in accordance with the present invention.
Figure 2:
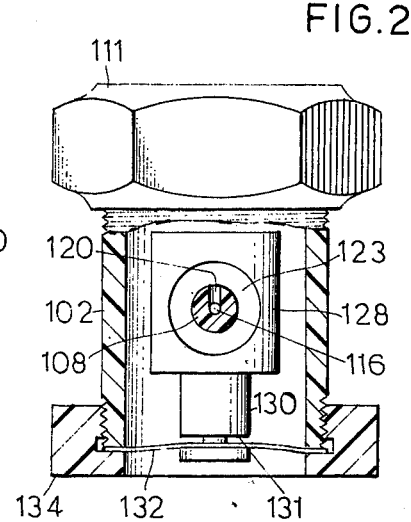
FIG. 2 is a sectional view along lines II—II of FIG. 1.
Figure 3:
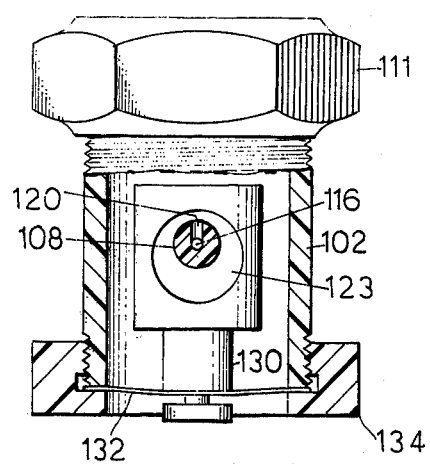
FIG. 3 is a view similar to FIG. 2 illustrating the displacement of parts of the regulator.
Figure 4:
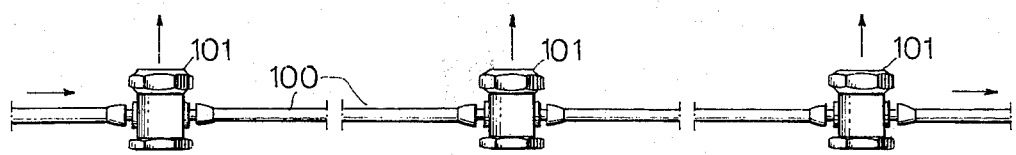
FIG. 4 illustrates a plurality of the regulators of FIG. 1 attached to a high-pressure line to provide a plurality of pressure-regulated taps therefrom.

FIG. 4 depicts a high-pressure fluid line 100 including a plurality of pressure-regulated taps 101 (three being shown) for supplying water at low pressure to a plurality of utilization devices such as water sprinklers. The structure of each pressure regulated tap 101 is as shown in FIGS. 1–3.

Each regulated tap comprises a housing 102 formed with an inlet opening 104 and an outlet opening 105 for connection to the high-pressure fluid line 100. Housing 102 is further formed with an outlet opening 106 for connection to the low pressure utilization device, such as a water sprinkler. A plastic tube 108 is supported within openings 104 and 105, and a pair of washers 109 provide seals between it and housing 102. Tube 108 carries a collar 110 at each end thereof bearing against washers 109.

Opening 106 of the housing is formed centrally of an upper cap 11 threaded on the open top section of the housing 102, the bottom section also being open as shown at 112.

The ends of tube 108 are adapted to be connected to the high-pressure fluid line 100. Tube 108 includes an axial passageway 16 extending therethrough, and a radial opening 120 communicating with passageway 116.

Disposed within housing 102 is a regulating ring generally designated 122. Ring 122 is of cylindrical shape and has an axial cylindrical bore 123 so as to define a top wall 124, and a spaced bottom wall 126 joined by side walls 128. Tube 108 is also cylindrical, but of smaller diameter than the internal diameter of ring 122 and is disposed within it so as to lie between the top and bottom walls of the ring and to be straddled by the side walls 128 spaced laterally on each side thereof.

Depending from bottom wall 126 of the regulating ring is a stem 130 formed with a lower annular groove 131. A resilient diaphragm 132 is formed with a central opening, the edges of which are received within annular grooves 131. The outer edges of the diaphragm are fastened to housing 102 by means of a collar 134 threaded onto the bottom of the housing and clamping the diaphragm between it and the end of the housing, with the underside or outer surface of the diaphragm always vented to the atmosphere.

Figure 12A:
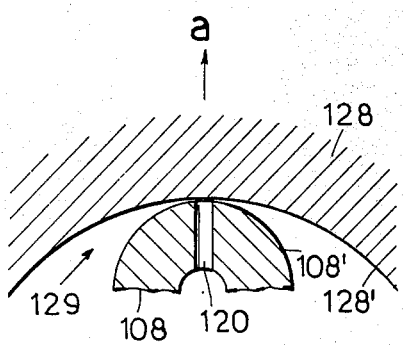
FIGS. 12a and 12b are enlarged fragmentary views of FIG. 3 helpful in understanding the operation of the device.
Figure 12B:
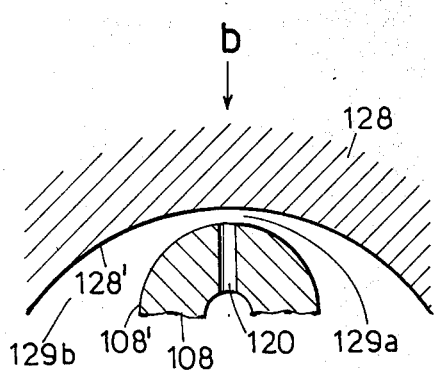

In the device of FIGS. 1–3, the flow of water through radial opening 120 tends to set ring 122 into vibration, moving same towards and away from the radial opening as briefly described above. This perhaps can be better seen by the enlarged fragmentary views of FIGS. 12a and 12b. It will be seen that since the curved face 128' of the regulating ring 128 has a larger radius of curvature than the curved face 108' of tube 108, when the latter face is contacted by the former one to close opening 120, the space 129 between the two faces increases from the periphery of opening 120 outwardly thereof. That is to say, the spacing 129a immediately adjacent to opening 120 is at a minimum and increases gradually outwardly, i.e. in the direction of space 129b. Thus, when ring 128 contacts tube 108 closing opening 120, the force of the fluid at opening 120 applies an outward force (shown by arrow "a") pushing the ring outwardly. As soon as the ring moves away from the tube, however, the velocity of the fluid at space 129a immediately adjacent to the periphery of opening 120 is much greater than at face 129b, because of the different curvatures in the face of the two members. A pressure gradient is thereby produced by the fluid flow, in which pressure gradient the pressure at face portion 129a immediately adjacent to opening 120 is much lower than the pressure outwardly thereof, at spacing 129b. The low pressure at face 129a applies an inward force (shown by arrow "b" in FIG. 12b) pushing the ring 128 back against tube 108 to close its opening 120. Thus, the pressure gradient produced by the different curvatures of the two faces of ring 128 and tube 108, together with the fluid force at opening 120, sets the regulating ring 128 into vibratory movement towards and away from the outlet opening 120 of tube 108, and thereby regulates the flow of the fluid through opening 120.

Upon the initial inrush of fluid through opening 120 into housing 102, diaphragm 132 will be flexed, as shown in FIG. 3, to bring the inner surface of regulating ring 128 against the outer face of tube 108 to close that opening, but thereafter the ring will vibrate in the manner described above to open and close the opening and thereby to regulate the flow of fluid therethrough. It is to be noted that outlet opening 106 in the housing is of many orders of magnitude greater in cross-sectional area than opening 120 in tube 108, and therefore there will be no substantial build-up of pressure within the housing above atmospheric pressure; the slight build-up of pressure that does occur in the housing is sufficient to deflect diaphragm 132 to bring ring 128 against tube 108, and to permit the ring to vibrate towards and away from the tube in the manner described above.

DESCRIPTION OF THE FIGS 5–8 EMBODIMENTS

FIGS. 5 and 6 illustrate a flow-responsive tap such as may be used for providing a slow trickle of irrigating water from a water supply pipe, the latter being generally designated 202. The tap illustrated in FIGS. 5 and 6 includes a housing 204 mounted in a circular opening 206 in the wall of the pipe 202. When so mounted, one end 208 of the housing 204 is disposed internally of the pipe, and the opposite end 210 is disposed externally thereof. Housing 210 is of substantially cylindrical shape except that an annular groove 212 is provided for mounting same in the wall of pipe 202 and the inner end 208 of the housing is of frustro-conical shape to facilitate its insertion into the wall of the pipe.

Housing 204 is formed with an axial bore 214, which is closed at the inner end 208 of the housing, but open at the opposite outer end 210. In addition, housing 204 is formed with a through-going cross-bore 216 at end 208, disposed within pipe 202, which cross-bore communicates with the axial bore 214. A tube 218 is disposed within cross-bore 16, as by being press-fitted therein, tube 18 being formed with an axial passageway 219 and with a radial opening 220 communicating with tube passageway 219 and housing bore 214.

Disposed within axial bore 214 is a stem 222 of slightly smaller cross-section than bore 214 so as to be movable or displaceable, within certain limits, within bore 214. The outer end 224 of stem 222 projects through the open end 210 of housing 204, and the opposite or inner end 227 of stem 222 is formed with a through-going cross-bore 226 of larger diameter than tube 218 and surrounding it. End 227 thus constitues a regulating ring and is movable towards and away from opening 220 in tube 218 as the stem is displaced within bore 214. In addition, outer end 224 of stem 222 is formed with an enlarged head 226 overlying the mouth of the bore.

The tap illustrated in FIGS. 5 and 6 operates substantially as described earlier when the ring portion (end 227) of stem 222 is set into vibratory movement towards and away from the opening 220 through tube 218, although the vibratory movement may be somewhat dampened because of the mass of the stem carried by the ring.

Thus, the tap provides flow-responsive regulation as the water flows from pipe 202 outwardly through bore 214 and the space between the mouth of the bore and head 226. Such a construction is particularly advantageous for use as a trickler nozzle.

FIG. 7 illustrates a similar tap to provide pressure-responsive regulation, such as for supplying irrigating water at a predetermined pressure from a water supply pipe 302 whose pressure may vary. In the pressure-responsive tap of FIG. 7, the elements corresponding to the FIGS. 5 and 6 tap are correspondingly numbered beginning with 300.

Thus, the pressure-responsive tap in FIG. 7 includes a cylindrical housing 304 mounted in an opening in the wall of the water supply pipe 302, the housing being formed with an axial bore 314 and with a through-going cross-bore 316 in which is disposed a tube 318 having an opening 320 formed therein. Disposed within bore 314 is a displaceable stem 322 having a cross-bore 326 defining a regulating ring 327 of larger internal diameter than end enclosing tube 318.

In the tap of FIG. 7, however, displaceable stem 322 is also formed with an axial bore 330 closed at its upper end by a cap 332 further formed with a bore 334. In addition, a flexible membrane 336 is connected between and closes the housing 304 at the mouth of its axial bore 314, and the outer end of stem 322, namely its cap 332. For this purpose, the outer end of housing 304 is formed with an annular groove 338 receiving one end of the flexible membrane 336, and cap 332 is formed with a similar annular groove 340 for receiving the opposite end of the flexible membrane.

It will be seen that the tap of FIG. 7 is pressure-responsive. That is to say, as the water flows from conduit 302 through tube 318, its opening 320, and out through the passageway fromed by bores 330 and 334, the water fills the space between membrane 336 and the upper end of housing 304. As the pressure within this space increases, stem 322 will be displaced upwardly, whereupon its lower or ring end 327 will move closer towards opening 320, thereby restricting the flow of the water through that opening and into the bore chambers. As the pressure drops, stem 322 will move in the opposite direction, downwardly, thereby increasing the space between end 327 of the stem and opening 320, and increasing the flow of the water into the bore chamber.

The interplay of forces described above, however, will cause the ring end 327 to vibrate towards and away from opening 320 in tube 318 to effect the pressure regulation.

FIG. 8 illustrates a similar construction, but for a liquid-level responsive tap such as may be used for supplying water to a poultry drinker. Also, in FIG. 8, the parts similar to those in the tap of FIGS. 5 and 6 are correspondingly numbered, but beginning with 400. Thus, the tap of FIG. 8 includes a housing 404 mounted in an opening formed in the wall of the water supply pipe 402. Housing 404 is also formed with an axial bore 414 and with a through-going cross-bore containing a tube 418 having an opening 420. A displaceable stem 422 is disposed within bore 414, the stem being formed with a cross-bore defining a regulating ring 427 of larger inner diameter than tube 418 and enclosing the tube.

In the embodiment of FIG. 8, the housing carries an external wall 450, preferably cylindrical in shape, surrounding stem 422. Wall 450 serves as a reservoir or receptacle for the water flowing from conduit 402 outwardly through the tap. Disposed within this reservoir is a float 452 fixed to the upper end of displaceable stem 422.

Thus, the water will flow out from conduit 402 and into the reservoir 450 in a similar manner as in the tap of FIGS. 5 and 6. In this case, however, the displacement of stem 422, which by its ring 427 controls the flow of the water through opening 420, will be responsive to the level of the liquid within the reservoir; but once the liquid level determined by the float is attained, it will be maintained by the vibratory movement of ring 427 towards and away from opening 420, in the manner described above.

DESCRIPTION OF THE FIGS. 9–11 EMBODIMENTS

Figure 9:
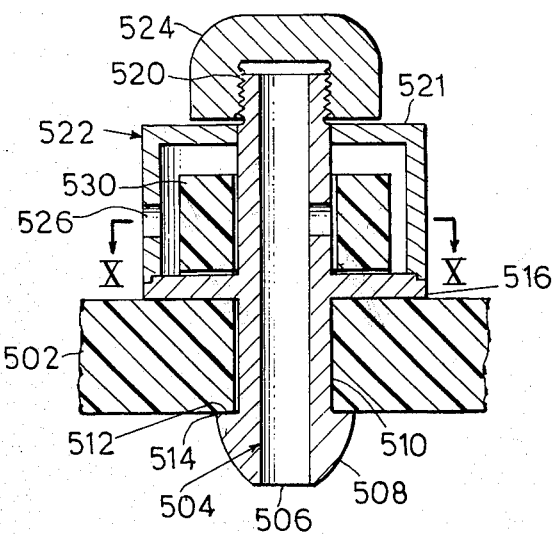
FIG. 9 is a longitudinal sectional view of another form of regulated water tap constructed in accordance with the invention, particularly for use as a trickler nozzle.
Figure 10:
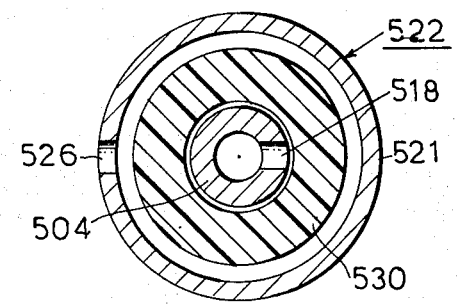
FIG. 10 is a transverse sectional view along lines X—X of FIG. 9.

The regulated water tap illustrated in FIGS. 9 and 10 is intended particularly for use as a water trickler nozzle tapped to a plastic water supply pipe 502. The tap includes a tube 504 having a throughgoing axial bore 506. One end of the tube 504 is frustroconically tapered, as shown at 508, to facilitate its insertion into an opening formed in the wall of the water supply pipe 502. Above tapered portion 508, tube 504 is formed with an annular groove 510 for seating therein the wall of the plastic supply pipe 502. One end of groove 510 is defined by an annular wall 512 extending at right angles to the axis of the tube and joined to form a sharp edge 514 with the tapered portion 508 of the tube. The other end of groove 510 is defined by an annular disc 516 integrally formed with the tube.

Above disc 516, tube 504 is formed with a radial opening 518 communicating with axial bore 516. The upper end of the tube is threaded as shown at 520.

Annular disc 516 cooperates with a cap 521 to define a housing 522 surrounding the upper end of tube 504. Cap 521 is attached by means of a nut 524 threaded into the upper end 520 of tube 504 and engageable with the cap to force it against the annular disc 516. An outlet opening 526 is formed in the wall of cap 521 opposite to radial opening 518 in tube 504.

Disposed within housing 522 is a regulating ring 530 having an inner diameter larger than the outer diameter of tube 504, and an outer diameter smaller than the inner diameter of housing 522. As shown, ring 530 is interposed between and aligned with radial opening 518 in tube 504 and opening 526 in housing 522. It is freely movable between the tube and the housing, being unconnected to either; and is dimensioned so that it will limit to close inlet opening 518 before it can limit to close outlet opening 526.

As described earlier, when water flows through radial opening 518 of tube 504, ring 530 will be set into a rapid vibratory movement towards and away from the radial opening 518. The opening is thus rapidly closed and opened, thus restricting the quantity of water flowing through it. For purposes of example, ring 530 may have an inner diameter of 4.5 mm and an outer diameter of 9.0 mm; tube 504 may have an outer diameter of 4 mm, a radial opening 518 of 1 mm diameter, and an axial passageway 506 of 2 mm diameter; and housing 522 may have an inner diameter of 10 mm. Such a tap was found to have an output of about 15 liters/hour, which output was fairly uniform with a supply line pressure varying from 1–4 atmospheres.

Outlet opening 526 in the housing may be very large and actually does not influence to any significant extent the quantity of water issuing from the tap. For example, the whole side of the housing 522 may be opened if desired. Radial opening 518 may vary in size, according to the flow rate desired, and this opening as well as outlet opening 526, may be non-circular, e.g., in the form of rectangular openings or slots.

Further, instead of closing the end of tube 504 by nut 524 (or by other means), that end may be left opened and connected to supply water to one or more additional taps attached in series to the tap illustrated.

Since openings 518 and 526 in the regulating unit illustrated may be relatively large, even with very slow flow rates, they are less susceptible to clogging. Should the device become clogged, for example by a particle lodged in opening 518, the user may merely push a pointed instrument through the outlet opening 526 to force ring 530 away from opening 518, whereupon a large quantity of water will flow through that opening into the housing and out through outlet 526, washing away the clogging matter. Therefore it is usually not necessary to disassemble the unit in order to clean it of clogging matter. Should it, nevertheless, be desired to disassemble it, this may conveniently be done by unthreading nut 524 to remove housing 522.

Figure 11:
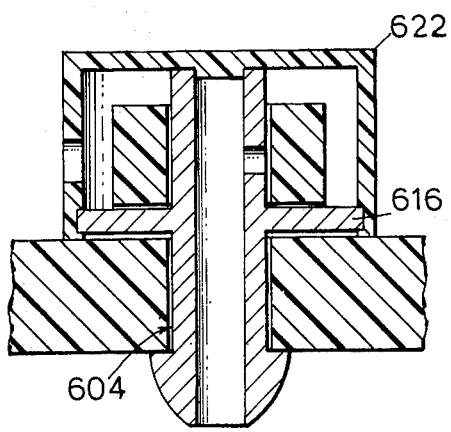
FIG. 11 is a longitudinal sectional view corresponding to FIG. 9 but illustrating a variation.

FIG. 11 illustrates a variation wherein the housing, 622 in this case, is press-fitted onto annular disc 616 of the tube 604. The construction and operation of the device are otherwise the same as described with respect to FIGS. 9 and 10.

Many other variations, modifications and applications of the illustrated embodiments will be apparent.

I claim:

1. A fluid-flow control device comprising a conduit member connectable to a source of pressurized fluid to be controlled and including an inlet opening, an axial passageway, and an outlet opening through which the fluid flows; and a regulating member movable towards and away from the conduit member outlet opening to close and open same and thereby to control the flow of fluid therethrough; characterized in that the face of the conduit member in which the outlet opening is formed is curved, and the face of the regulating member closing the outlet opening is also curved but with a different curvature from that of the conduit member face, such that the curved regulating member face diverges from the curved conduit member face outwardly from the periphery of the outlet opening formed in the latter face to provide a spacing between the two curved faces which increases from the periphery of the outlet opening outwardly thereof, whereby as the regulating member moves away from the conduit member outlet opening to permit the fluid to flow therethrough, a pressure gradient is produced in which the pressure is lower at the periphery of said opening than outwardly thereof, and which therefore tends to move the regulating member towards the conduit member outlet to close same, said pressure gradient acting with the fluid force to set the regulating member into vibratory movement towards and away from the conduit member outlet opening during the flow therethrough.

2. A device according to claim 1, further including a housing enclosing the regulating member and the outlet of the conduit member, said housing being formed with an outlet opening.

3. A device according to claim 2, wherein the conduit member is tubular in shape and is formed with a radial passageway communicating at its inner end with said axial passageway, and constituting at its outer end said outlet opening, and wherein said regulating member includes a cylindrical bore of larger diameter than the diameter of said tube and in which bore the tube is disposed, the outer face of the tube and the inner face of the bore constituting said two curved faces in the conduit and regulating members respectively.

4. A device according to claim 2, wherein said regulating member is mounted within the housing by a flexible diaphragm.

5. A device according to claim 4, wherein the housing includes an outer wall and a nut threaded thereto at one end, said flexible diaphragm being fixed along its outer periphery between the housing wall and the nut, and mounting at its center the regulating member.

6. A device according to claim 3, wherein said tubular conduit member is mounted within a first bore formed in the housing, and wherein said regulating member is mounted within a second bore formed in the housing at right angles to the first bore, said second bore being closed at its inner end and open at its outer end, the latter constituting said outlet opening of the housing and being disposed on the side of the tubular conduit member opposite to the outlet opening thereof.

7. A device according to claim 6, wherein said regulating member includes a stem passing through said second bore of the housing and through the outlet opening thereof, said stem being of slightly smaller external diameter than the diameter of said second bore.

8. A device according to claim 6, wherein the end of the regulating member stem passing through said second bore of the housing is formed with an enlarged head overlying the mouth of said second axial bore, said stem being freely slidable within said second housing bore.

9. A device according to claim 6, further including a flexible membrane connected between and closing the housing at the mouth of said axial bore, and the end of the regulating member stem passing therethrough, forming a chamber between said stem and housing, said stem being formed with an outlet passageway extending axially therethrough and communicating with said second housing bore.

10. A device as defined in claim 6, further including a wall carried by the open end of the housing and defining a reservoir for the fluid, the latter being a liquid, said stem carrying a float disposed within the reservoir, whereby the liquid-flow is also controlled by the level of the liquid within the reservoir.

11. A fluid-flow control device comprising a conduit member connectable to a source of pressurized fluid to be controlled and including an inlet opening, an axial passageway, and an outlet opening through which the fluid flows; and a regulating member movable towards and away from the conduit member outlet opening to close and open same and thereby to control the flow of fluid therethrough; characterized in that the face of the conduit member in which the outlet opening is formed is curved, and the face of the regulating member closing the outlet opening is also curved but with a different curvature from that of the conduit member face, such that the curved regulating member face diverges from the curved conduit member face outwardly from the periphery of the outlet opening formed in the latter face to provide a spacing between the two curved faces which increases from the periphery of the outlet opening outwardly thereof, whereby when the regulating member is close to the conduit member outlet opening, the fluid flowing through the latter opening produces a pressure gradient in which the pressure is lower at the periphery of said opening than outwardly thereof, and which pressure gradient therefore tends to move the regulating member towards the conduit member outlet opening to close same.

* * * * *